Oct. 2, 1928.
M. DORAN
1,686,442
FENDER STRAIGHTENING DEVICE
Filed Dec. 21, 1926
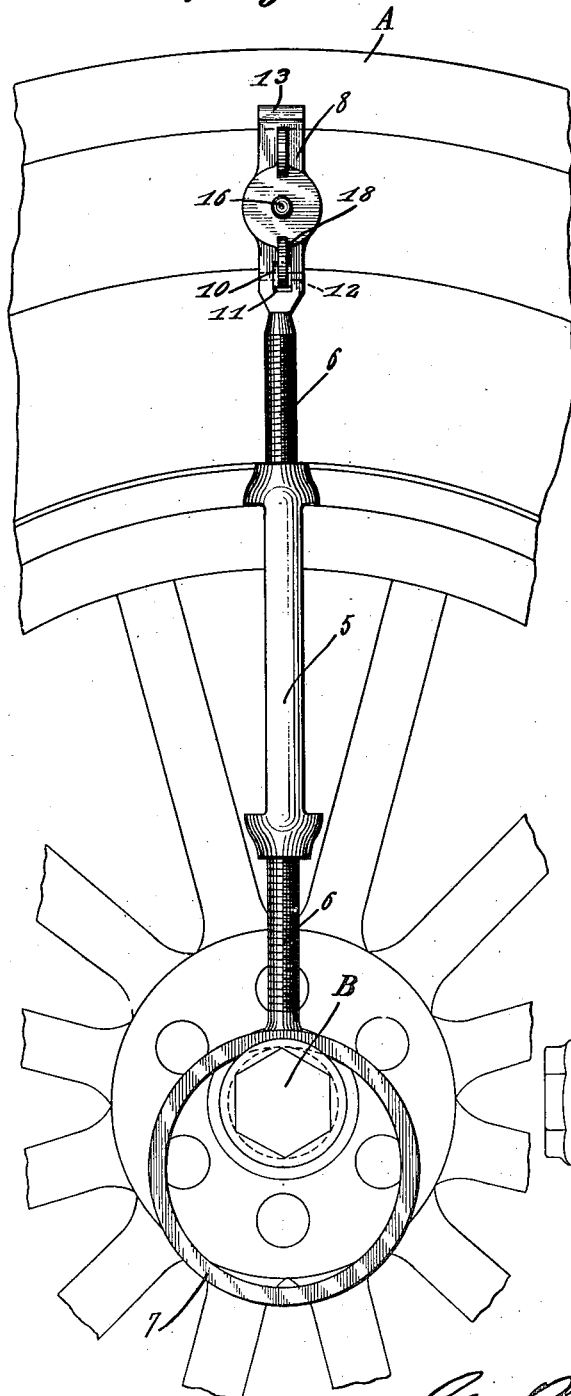
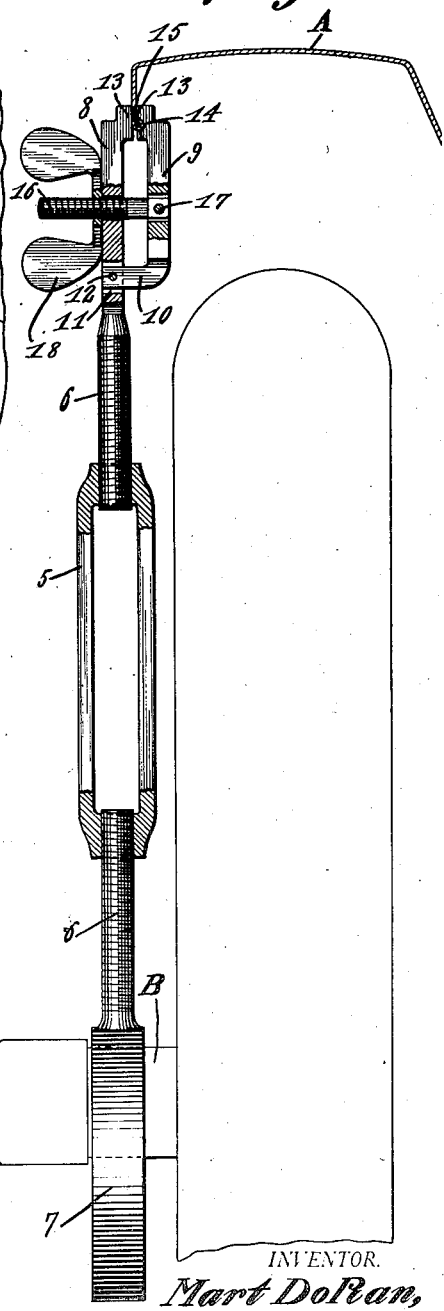
INVENTOR.
Mart Doran,
BY
Geo. P. Kimmel.
ATTORNEY.

Patented Oct. 2, 1928.

1,686,442

UNITED STATES PATENT OFFICE.

MART DO RAN, OF LINCOLN, NEBRASKA.

FENDER-STRAIGHTENING DEVICE.

Application filed December 21, 1926. Serial No. 156,161.

The invention relates to a tool or implement, designed specifically for the straightening of fenders or mud guards of automobiles.

The primary object of the invention is the provision of a tool or implement of this character, wherein a fender or mud-guard which has become deformed, by sagging or drooping, can be conveniently straightened, to bring the same to normal position, whereby its bracket support may be regulated to sustain such fender or mud-guard in its normal position.

Another object of the invention is the provision of a tool or implement of this character, wherein the construction thereof is novel in form, so that the same can be adjusted to accommodate itself with relation to a deformed fender or mud-guard and a supporting part of the automobile or vehicle, so that upon the adjustment of said tool or implement, the deformed mud-guard or fender may be straightened or elevated to normal position.

A further object of the invention is the provision of a tool or implement of this character, wherein the fender or mud-guard of the automobile can be conveniently and easily clamped thereto and such tool or implement mounted upon the hub of the wheel of an automobile adjacent to such fender or mud-guard to be straightened or other stationary part of such automobile, so that on manipulation of the tool or implement the said fender or mud-guard can be straightened or elevated to normalcy, thus relieving the same from deformity.

A still further object of the invention is the provision of a tool or implement of this character, wherein the construction thereof is such, as to enable the easy and convenient application and manipulation thereof, with dispatch for the straightening of a fender or mud-guard, which has become deformed by sagging or drooping, due to an accident or otherwise, the replacement to normalcy of such fender or mud-guard being effected without excessive strain or exertion on the part of the manipulator of the tool or implement.

A still further object of the invention is the provision of a tool or implement of this character, which is extremely simple in construction, possessing of but few parts, strong, durable, thoroughly reliable and efficient in its purpose, readily and easily portable, and inexpensive to manufacture.

With these and other objects in view, the invention consists in the features of construction, combination and arrangement of parts, as will be hereinafter more fully described in detail, illustrated in the accompanying drawing, showing the preferred embodiments of the invention and pointed out in the claims hereunto appended.

In the accompanying drawing:—

Figure 1 is a side elevation of a tool or implement for straightening fenders or mud-guards of automobiles, constructed in accordance with the invention, and shown applied, the fender and automobile wheel to which the tool or implement is applied, being only partly illustrated.

Figure 2 is an edge elevation of the tool or implement, portions thereof being broken away.

Similar reference characters indicate corresponding parts throughout the several views in the drawing:

Referring to the drawing in detail, A designates a portion of a fender or mud-guard of an automobile and B the hub of one of the wheels of the automobile, these being illustrated merely to show the application of the tool or implement hereinafter more fully described.

The tool or implement comprises an intermediate member in the form of an elongated turnbuckle 5 of a common well known form, having reversely threaded in opposite ends the stems 6 one being formed integrally with a loop 7 which constitutes an open eye or collar to encircle and abut the hub B. This loop or eye 7 is of relatively large size so that it can be passed or moved over the hub B of various sized wheels. The other stem 6 carries a clamping head comprising a flat elongated stationary jaw 8 and a correspondingly shaped swinging or movable jaw 9. This swinging or movable jaw is formed with a lateral reduced pivot heel 10 at right angles to the working face of said jaw 9 and is projected into a suitable elongated slot 11 formed in the stationary jaw 8 and pivotally engaged therein through the medium of a pintle or pivot pin 12, which intersects the slot and is permanently held in the stationary jaw 8 of the clamp.

The jaws 8 and 9 of the clamp at their free ends are inset to provide clamping noses 13, the one on the movable jaw 9 being formed with a transverse notch 14, which serves to accommodate the bead 15 ordinarily present upon the ledge or downturned flange of the fender or mud-guard A as is illustrated in Figure 2 of the drawing.

The movable jaw 9 at a substantially medial point thereof is fitted with an adjusting screw 16, which is pivotally connected at 17 with the said movable jaw 9 and works through a suitable hole or opening in the stationary jaw 8 and adjustably threaded upon this screw 16 is a winged nut 18, the latter playing against the stationary jaw 8 and is designed to shift said movable jaw 9 toward and away from the stationary jaw in the application and removal of the tool or implement to and from the fender A.

In the application of the tool or implement the jaws 8 and 9 are opened by manipulating the nut 18 on the screw 16 to enable the beaded portion of the flange of the fender A to be inserted between the noses 13 of said jaws and thereafter the clamp is closed so that the bead 15 of the fender or mud-guard will engage in the seat 14 or notch of one of the noses 13 and in this manner the fender or mud-guard will be firmly secured in the clamp. The loop or eye 7 is engaged about the hub B of the wheel of the automobile and is designed to be supported thereon as is clearly shown in Figures 1 and 2 of the drawing. Thereafter the turnbuckle 5 is manipulated so as to raise the fender A or bring the same from deformed position to normalcy. When the fender A has been brought to normal condition the same can be anchored in any desired manner either by adjustment of its bracket or other support.

The tool or implement is removed by the opening of its jaws 8 and 9 and the disengagement of the loop or eye 7 from the hub of the wheel as will be clearly apparent.

From the foregoing it is thought that the construction and manner of operation of the device will be clearly understood, therefore more extended explanation has been omitted.

What is claimed is:—

1. A fender straightening device comprising a pair of oppositely extending stems, one provided at its inner end with an abutment and the other at its outer end with a straightening clamp for the fender, means engaging with the outer end of that stem provided with the abutment and the inner end of that stem provided with a clamp for adjusting said stems relative to each other, said clamp including a stationary and an adjustable jaw, said adjustable jaw being pivoted to that stem carrying the clamp, said jaws coacting to clamp the fender therebetween.

2. A fender straightening device comprising a pair of oppositely extending stems, one provided at its inner end with an abutment and the other at its outer end with a straightening clamp for the fender, means engaging with the outer end of that stem provided with the abutment and the inner end of that stem provided with a clamp for adjusting said stems relative to each other, said clamp including a stationary and an adjustable jaw, said adjustable jaw being pivoted to that stem carrying the clamp, said jaws coacting to clamp the fender therebetween, and said adjustable jaw formed with a notch to receive the bead of the fender.

3. A fender straightening device comprising a pair of oppositely extending stems, one provided at its inner end with an abutment and the other at its outer end with a straightening clamp for the fender, means engaging with the outer end of that stem provided with the abutment and the inner end of that stem provided with a clamp for adjusting said stems relative to each other, said clamp including a stationary and an adjustable jaw, said adjustable jaw being pivoted to that stem carrying the clamp, said jaws coacting to clamp the fender therebetween, and said jaws having their free ends provided with inset portions arranged in opposed relation.

4. A fender straightening device comprising a lengthwise adjustable anchoring means, a stationary jaw at one end of said means, a jaw opposing and pivoted to the stationary jaw, means pivoted to the pivoted jaw and slidably extending through the stationary jaw for adjusting the pivoted jaw relative to the stationary jaw, and said jaws coacting to clamp the fender on the adjustment of the pivoted jaw.

5. A fender straightening device comprising a lengthwise adjustable anchoring means, a stationary jaw at one end of said means, a jaw opposing and pivoted to the stationary jaw, means pivoted to the pivoted jaw and slidably extending through the stationary jaw for adjusting the pivoted jaw relative to the stationary jaw, and said jaws coacting to clamp the fender on the adjustment of the pivoted jaw, said jaws having their free ends formed with inset portions arranged in opposed relation and with one of said inset portions notched to receive the bead of the fender.

In testimony whereof, I affix my signature.

MART DORAN.